US00RE42469E

(19) United States
(12) Reissued Patent
Yu et al.

(10) Patent Number: US RE42,469 E
(45) Date of Reissued Patent: Jun. 21, 2011

(54) BATTERY CHARGER AMUSEMENT DEVICE

(75) Inventors: Sun Yu, Berkley, MI (US); David Perrin, Warren, MI (US)

(73) Assignee: Zen Design Group, Berkley, MI (US)

(21) Appl. No.: 12/218,055

(22) Filed: Sep. 17, 2008

Related U.S. Patent Documents

Reissue of:
(64) Patent No.: 7,259,541
Issued: Aug. 21, 2007
Appl. No.: 11/405,889
Filed: Apr. 18, 2006

U.S. Applications:
(63) Continuation-in-part of application No. 10/600,260, filed on Jun. 20, 2003, now Pat. No. 6,995,542, and a continuation of application No. 10/101,907, filed on Mar. 19, 2002, now Pat. No. 7,030,592.

(51) Int. Cl.
*H02J 7/00* (2006.01)

(52) U.S. Cl. ..... 320/137; 320/113

(58) Field of Classification Search ..... 320/106, 320/107, 113, 132, 115, 164, 137, 160, 117, 320/161, 110, 20, 39, 125; 446/356, 353, 446/457, 390; 429/49, 96, 100
See application file for complete search history.

(56) References Cited

U.S. PATENT DOCUMENTS

| | | | | |
|---|---|---|---|---|
| 3,629,680 | A | 12/1971 | Baynes et al. | |
| 4,101,818 | A * | 7/1978 | Kelly et al. | 320/110 |
| 4,766,361 | A | 8/1988 | Pusateri | |
| 4,891,029 | A | 1/1990 | Hutchinson | |
| 5,057,761 | A | 10/1991 | Felegyhazi, Sr. | |
| 5,061,579 | A | 10/1991 | Ishimoto | |
| 5,115,182 | A | 5/1992 | Ehmke et al. | |
| 5,157,320 | A | 10/1992 | Kuriloff | |
| 5,164,652 | A | 11/1992 | Johnson et al. | |
| 5,334,075 | A * | 8/1994 | Kakizaki et al. | 446/438 |
| 5,371,453 | A | 12/1994 | Fernandez | |
| 5,371,456 | A | 12/1994 | Brainard | |
| 5,534,765 | A | 7/1996 | Kreisinger et al. | |
| 5,686,811 | A | 11/1997 | Bushong et al. | |
| 5,767,655 | A | 6/1998 | Ostendorff et al. | |
| 5,818,197 | A | 10/1998 | Miller et al. | |
| 5,892,350 | A | 4/1999 | Yoshikawa | |
| 5,917,310 | A * | 6/1999 | Baylis | 322/1 |
| 5,949,215 | A * | 9/1999 | Takakura | 320/114 |
| 6,142,846 | A | 11/2000 | Ojakaar | |
| 6,171,171 | B1 | 1/2001 | Barthold | |
| D438,171 | S | 2/2001 | Tang et al. | |
| D446,500 | S | 8/2001 | Krieger et al. | |
| 6,326,767 | B1 | 12/2001 | Small et al. | |
| 6,424,120 | B1 | 7/2002 | Chen | |
| 6,546,436 | B1 | 4/2003 | Fainmesser et al. | |
| 6,565,371 | B1 * | 5/2003 | Watanabe | 439/138 |
| 6,652,352 | B1 * | 11/2003 | MacArthur et al. | 446/356 |
| 6,696,922 | B1 | 2/2004 | Wong et al. | |
| 6,764,373 | B1 * | 7/2004 | Osawa et al. | 446/175 |
| 7,030,592 | B2 | 4/2006 | Yu | |
| 2002/0063550 | A1 | 5/2002 | Chen et al. | |

* cited by examiner

*Primary Examiner* — Rajnikant B Patel
(74) *Attorney, Agent, or Firm* — Patent Procurement Services

(57) ABSTRACT

A battery charger amusement has a receptacle adapted to receive a rechargeable battery, an electronic circuit monitoring battery charge status, and a mechanical movement signal activated upon charge status attainment. The battery charger can include a motion actuator so as to move during the battery recharge process. The device is intended to encourage the use of rechargeable batteries over a disposable counterpart.

19 Claims, 4 Drawing Sheets

BATTERY CHARGER AMUSEMENT DEVICE

Matter enclosed in heavy brackets [ ] appears in the original patent but forms no part of this reissue specification; matter printed in italics indicates the additions made by reissue.

RELATED APPLICATIONS

This application is a continuation of U.S. patent application Ser. No. 10/101,907 filed Mar. 19, 2002, now U.S. Pat. No. 7,030,592 [issuing] *issued* Apr. 18, 2006[.]*; and a continuation-in-part of U.S. patent application Ser. No. 10/600, 260 filed Jun. 20, 2003, now U.S. Pat. No. 6,995,542 issued Feb. 27, 2006, which are* incorporated herein by reference.

FIELD OF THE INVENTION

The present invention relates to a battery charger device activated by the insertion of a battery to provide educational or entertainment routines.

BACKGROUND OF THE INVENTION

The societal cost of disposable batteries will be felt for generations to come as leachants find their way into soil and ground water. While recent advances in dry cell technology have reduced the toxicity of corroding disposable batteries, the sheer quantity of discarded batteries represents a significant burden on landfills. Annual domestic consumption of disposable batteries exceeds 1.9 billion cells. In most instances, disposable batteries cost a consumer more over time than does a rechargeable battery, yet disposable batteries remain popular owing to the inconvenience of battery charging. Thus, there exists a need for a battery charger device that provides communication with the user other than battery charge status so as to encourage the battery charge. It is intended that with the usage of the present invention, chargeable batteries displace ever more disposable cells.

SUMMARY OF THE INVENTION

A battery charger amusement device includes a battery charger having a receptacle adapted to receive a rechargeable battery. A battery recharge electronic circuit monitors the charge status of a battery placed in the receptacle. A mechanical movement signal is activated by the battery attaining a preselected charge status. The device housing is configured as an attractive item retained in sight when not in use. The mechanical movement signal of having a battery or inventive device portion pop up, begin or stop mechanical movement based on preselected battery charge status alerts a user of charge status attainment and encourages device usage.

DESCRIPTION OF THE PREFERRED EMBODIMENT

The present invention is intended to add amusement value to the task of battery charging. Upon a rechargeable battery being coupled to an inventive device, an electronic circuit is activated that communicates information independent of charge status to a user. The form and content of the information so supplied is not critical. In an alternate embodiment, the present invention contains an electronic circuit that monitors battery charge status and triggers a mechanical movement signal to indicate that the battery has achieved a preselected charge status. The housing for the inventive device can take on any shape and color and be modeled into any number of humanoid, animal, vehicle, imaginary or natural forms. Similarly, the housing texture and materials of construction are not critical limitations.

Figure 1:
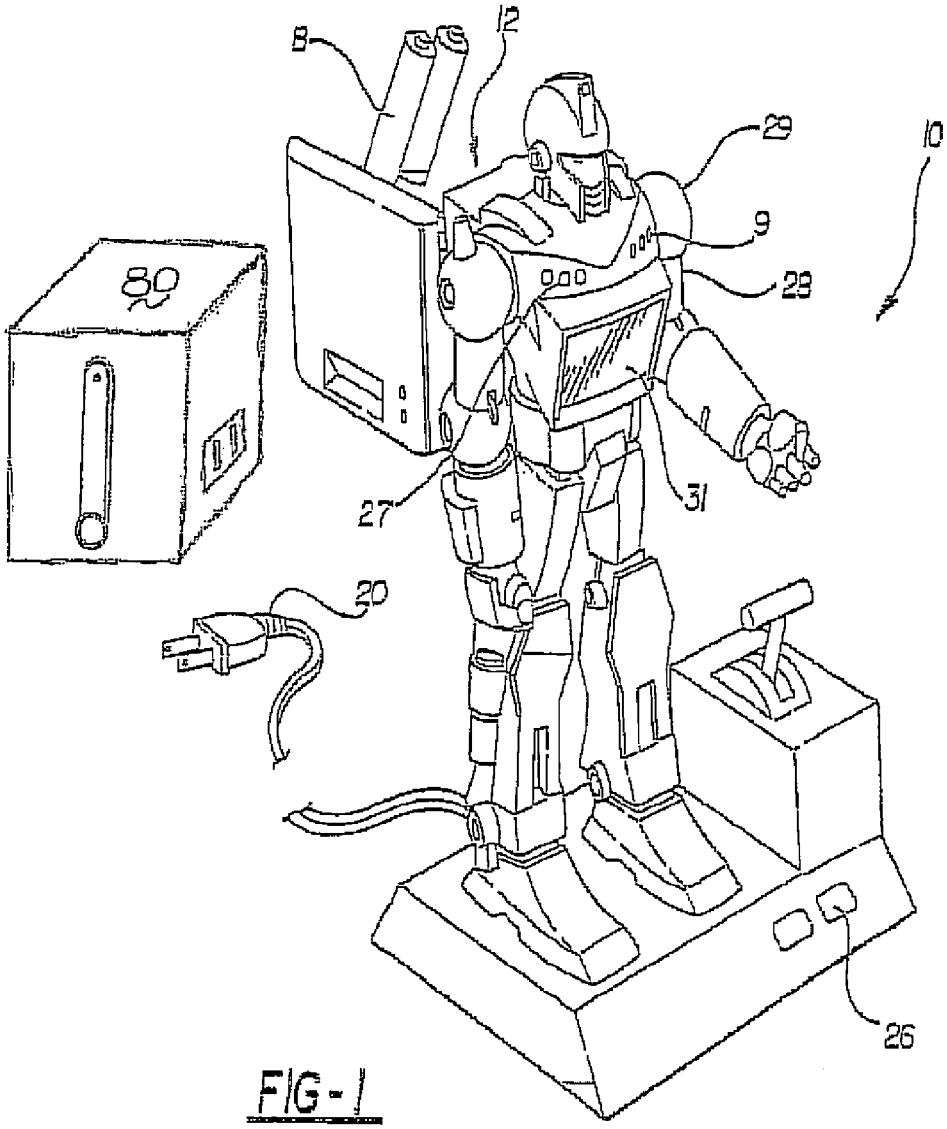
FIG. 1 is a perspective view of a battery charger amusement device according to the present invention.
Figure 1A:
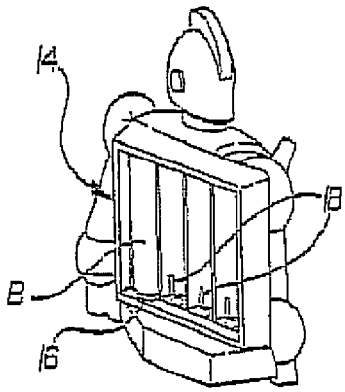

Referring now to FIG. 1, a battery charger amusement device according to the present invention is shown generally at 10. The device includes a conventional battery charger 12 including a receptacle 14 adapted to receive at least one rechargeable battery B. The insertion of a battery B into the receptacle 14 (shown in ghost) or a manual action activates a mechanical or electrical switch 16 which in turn initiates an electronic circuit 18 to begin the communication of information independent of charge status. It is appreciated that any number of conventional battery chargers is operative herein upon modification to include a switch 16. Representative of the battery chargers operative herewith are those disclosed in U.S. Pat. No. 4,237,409. Typical of a conventional battery charger is a graphical icon 19 or LED 19' indicative of the charge status of a battery B. It is appreciated that the size and type of battery B is not critical to the present invention. For example, nickel-cadmium, metal hydride, acid, and polymeric batteries are operative herein. Operative battery sizes illustratively include 24 volt, 12 volt, 9 volt, AAA, AA, B, C, and D sized cells. Power sources to drive the battery charger 12 and the electronic circuit 18 include line power, a direct current generator, a dynamo *80* and solar cell. It is appreciated that a transformer or adaptor 20 is often required based on the power characteristics of the source P. Optionally, an inventive battery charger 12 further includes an alternating current (AC) coupler as the transformer or adaptor 20.

The electronic circuit 18 in simplest form integrates a light source, laser diode or other electronic component so as to communicate sound or light information stored within the device on an integrated circuit or on a replaceable memory storage device to a user upon insertion of a battery B. The inventive device communicates information upon insertion of a rechargeable battery or through any activation switch being engaged. In alternate embodiments, the device communicates information in the form of spoken utterances or motion. Optionally, electronic circuit 18 is coupled to an information communicating component illustratively including an electric motor, a light source, a video display, a sound synthesizer, or combination thereof. In a preferred embodiment, the electronic circuit 18 includes a microprocessor (not shown) to facilitate more sophisticated communication. In a still more preferred embodiment, a microprocessor is coupled to a memory or data reading device, illustratively including a DRAM chip, CD player, DVD, hard drive, floppy disk drive, and cassette player, and combinations thereof. In still another preferred embodiment, the electronic circuit 18 is coupled to a user input interface 26. A user input interface 26 provides for an interactive question and answer format between a user and the inventive device, or data entry or icon manipulation as part of a gaming system.

The inventive device preferably includes a housing 28. Preferably, the housing is configured to have the appearance of a person *28C*, robot *28*, animated character *28D*, animal *28B*, a vehicle *28A* or an object found in nature such as a mountain, tree, or a diorama. *These alternate housings 28A-*

*28D are shown in FIG. 4.* The housing 28 is really constructed from a variety of durable materials consistent with proximity to electronic circuitry and a battery charger. These housing materials illustratively include plastics, polymeric resins, textile plush, metal, and recycled forms thereof. In the embodiment depicted in FIG. 1, the housing 28 is configured in the form of a robot having moveable jointed appendages 29, LEDs 30, a sound synthesizer (not shown), and a video display 31 of which are activated engaging a switch 33 or upon insertion of a battery B therein. Optionally, the device of FIG. 1 further includes an information memory or reader device (not shown) for the uploading of information content and programs, as well as a user input keypad illustratively including a compact disk (CD) player, DVD, floppy disk drive, ZIP disk drive and the like. The embodiment depicted in FIG. 1 preferably also includes a microprocessor (not shown) operating to drive the information communicating functions. It is appreciated that somewhere all of these information communicating components can be incorporated into a different form of housing illustratively including a drive-in movie theater, racing pit-stop, or service station where the spent battery B is loaded into a receptacle incorporated into a model car or other portion of the housing.

It is appreciated that in addition to the entertainment or educational information content provided by the inventive device, in a preferred embodiment, information regarding the battery charge status is also provided as per a conventional battery charger. As is conventional to battery chargers, a battery B is monitored as to voltage and current during the charging process.

Figure 2:
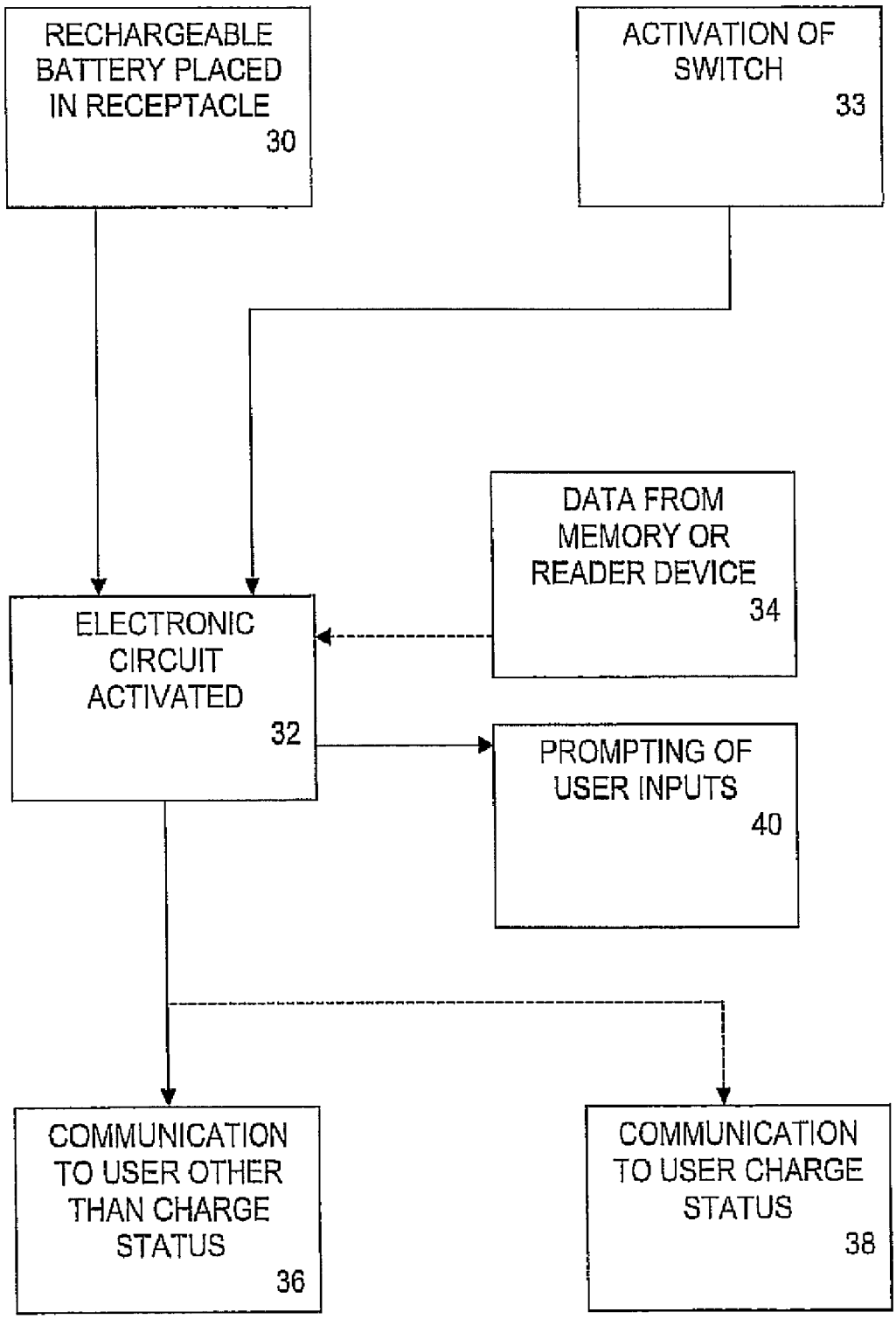
FIG. 2 is a flowchart depicting a use process for the present invention; [and]

Referring now to FIG. 2, the operation of an inventive battery charger amusement device coupled to a power source is initiated by placing a rechargeable battery into a battery rechargeable receptacle 30 for a charging duration or by a user activation switch 33. The contact of the rechargeable battery B with the battery charger or the activation switch 33 initiates an electronic circuit 32 optionally receiving content or executable programs from a memory device or reader 34. The electronic circuit then begins to communicate information to a user independent of the battery charge status 36. The information is in the form of spoken utterances, music, light or movement. Preferably, battery charge status information is also provided 38. Battery charge status as used herein is defined to include contact with battery charger terminals, ability of battery to accept a charge, and the dynamic current and voltage status of the battery. User inputs 40 are prompted by the inventive device and knowledge for coordination-based interactive game formats.

Figure 3:
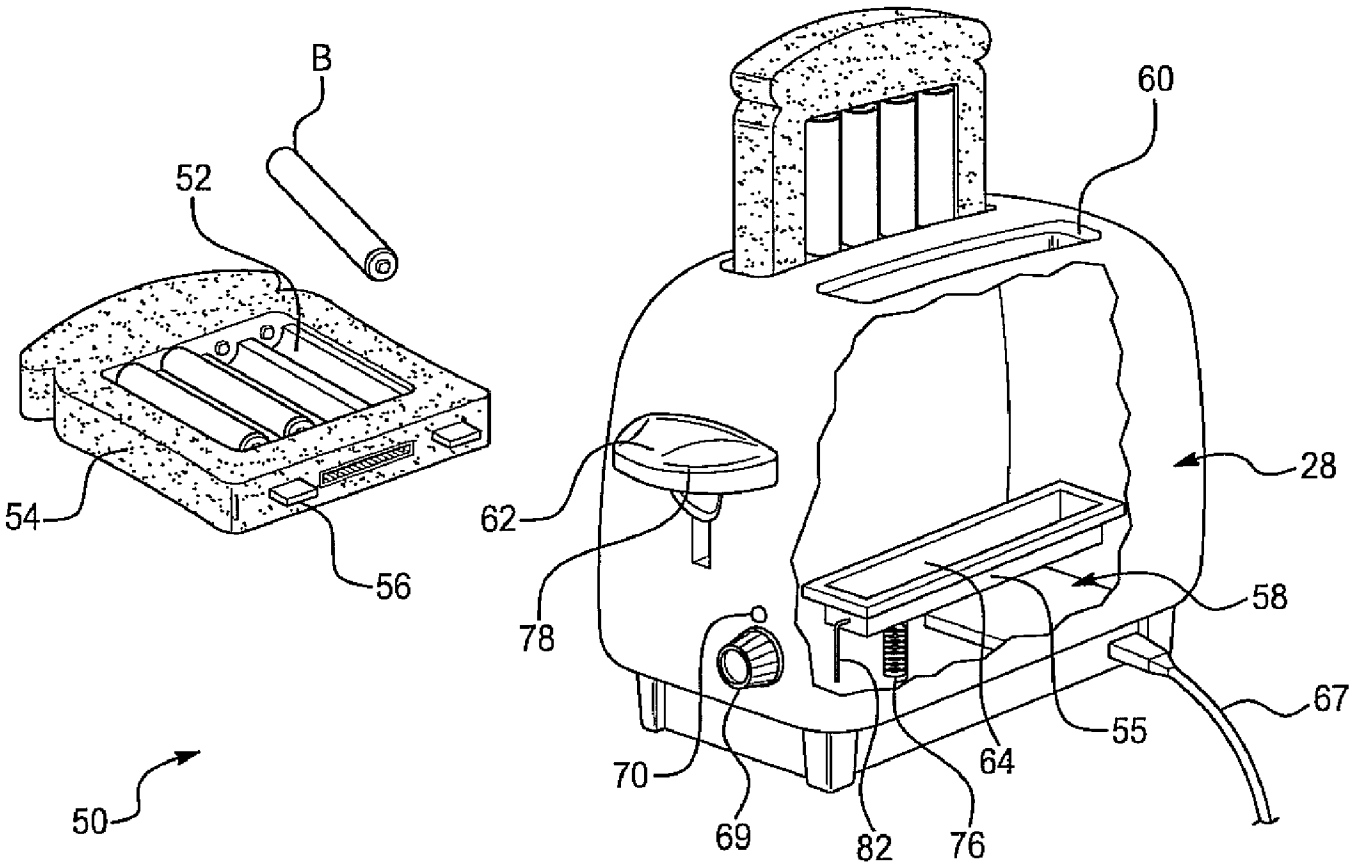
FIG. 3 is a partial cutaway perspective view of an alternate embodiment of a battery charger amusement device according to the present invention[.]*; and*
Figure 4A:
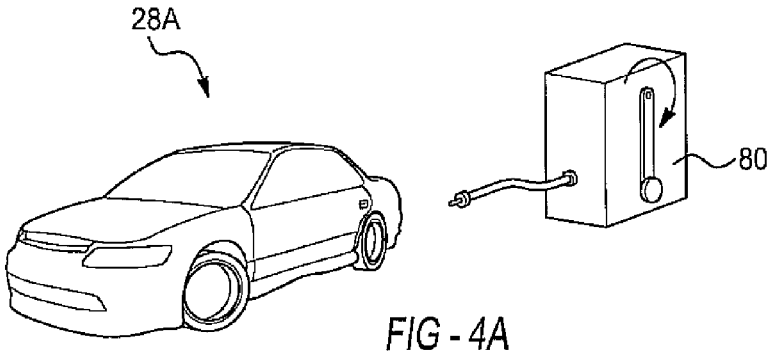
*FIGS. 4A-4D are views of housings.*
Figure 4B:
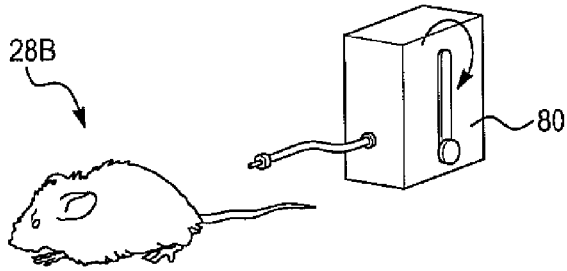
Figure 4C:
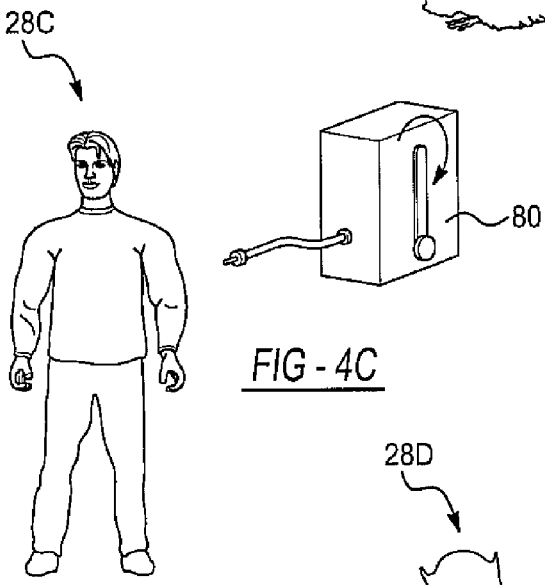
Figure 4D:
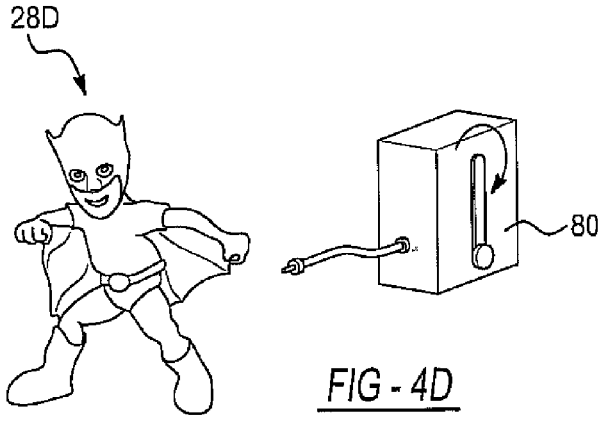

Referring now to FIG. 3, a battery charger amusement device according to the present invention that affords mechanical notice of battery charge status is shown generally at 50 where like numerals correspond to those aspects detailed herein with respect to FIG. 1 or 2. The device 50 has a receptacle 52 adapted to receive at least one rechargeable battery B. In the embodiment depicted in FIG. 3, the receptacle 52 is within a caddy 54. The caddy 54 having charging contacts 56 mateable with complementary contacts 55 in electrical communication with a conventional battery charger shown generally at 58 located within a housing 28. In the embodiment depicted in FIG. 3, the housing 28 is simulative of a toaster and the battery caddy 54 simulative of a bread slice. Upon insertion of the caddy 54 into an aperture 60 of the housing 28, the charging contacts 56 bring the rechargeable battery B into electrical communication with the battery charger 58. As is conventional to battery chargers, battery charge status is evaluated prior to the initiation of battery charging. The cradle 54 upon being placed in the aperture 60 of the housing 28 engages a raising mechanism 62. The raising mechanism 62 depicted in FIG. 3 includes a spring-loaded tray 64 coupled to a lever 66. However, it is appreciated that a motor driven rack gear, or other conventional means for raising the caddy 54 relative to the housing 28, is also operative herein. The battery charger circuitry 58 is coupled to a charging source such as line power by way of a detachable cord 67. Preferably, an analog dial 69 is provided within the housing 28 to provide the battery charger 58 with battery type information. It is appreciated that battery type information is alternately communicated to the battery charger through the use of a caddy 54 selective for each of a variety of rechargeable battery types. A light emitting diode indicator 70 illuminates while battery recharging is in progress.

In actual operation, the battery caddy 54 is loaded into a recharger aperture such that the caddy rests upon a spring-loaded tray 64. The tray 64 has a cutout in the base thereof such that charging contacts 56 protrude from beneath the tray 64. Upon pressing the caddy 54 into the aperture in order to compress a spring 76 coupled to an external lever 78, a catch [80] *82* anchored to the toaster housing engages the spring loaded tray [74] *64* after the caddy contacts 56 are electrically coupled to complementary contacts 55. The contacts 55 in turn being electrically coupled to the battery recharger circuitry 58. Upon coupling between the caddy 54 by way of contacts 56 to the complementary contacts 55, and the verification by battery recharger 58, the LED indicator 70 is illuminated. Upon a battery B completing recharge in inventive recharger 50, the battery recharger 58 activates a solenoid to release the catch and thereby allow the spring loaded tray 64 to eject the caddy 54 from the receptacle. The caddy 54 projecting from the aperture signals to a user the completion of the recharge process. It is appreciated that in addition to a solenoid releasing a catch, other conventional electrical components are operative herein to simulate the action of a toaster and allow the caddy 54 to project from the aperture. In an alternate embodiment, the receptacle 55 is incorporated into the spring-loaded tray 64. The contacts 55 are in electrical communication with the battery charger 58 by way of leads sufficiently long to accommodate the travel of the contacts 55 within the housing 50. It is appreciated that in an alternate embodiment of an inventive battery charger that affords mechanical notice of charge status, and in particular completion of battery recharge, that a caddy need not be used but rather the batteries inserted directly into a charger affording mechanical notice of charge status. In still another inventive embodiment, the charger is configured in the form of a "jack-in-the-box" with a portion thereof being projected in order to signify the completion of charging. Still other configurations include a coffee maker type design where a powder or liquid material moves from one region of the recharger to another consistent with the progression of battery recharge. Still other embodiments illustratively include a carousel that revolves only during battery recharging, a figurine that changes orientation or movement consistent with charge status, and the like that are consistent with the invention as detailed herein. It is further appreciated that one skilled in the art will readily recognize that various spring-loaded and mechanized toys and appliances are readily coupled to a battery charger as detailed herein such that mechanical notice is provided consistent with battery charge status and in particular, the completion of battery recharge.

All references cited herein are hereby incorporated by reference to the same extent as if each reference was individually and specifically incorporated by reference. These references are indicative of the levels of skill in the art at the time of invention.

A particular embodiment of the invention having been detailed herein, it is appreciated the changes and modifications may be made by those skilled in the art without departing from the invention in its broader aspects. The embodiments described herein are considered exemplary and not intended to limit the scope of the appended claims.

The invention claimed is:

1. A battery charger amusement device comprising:

a housing configured in a form selected from the group consisting of: humanoid, animate, vehicular and natural;

a dynamo powering a battery charger in electrical communication with a rechargeable battery, the battery having a charge status; and a source of information communicated to a user and selected from the group consisting of: sound, light, movement or a combination thereof for entertaining the user of the device, the information being independent of battery charge status.

2. The device of claim 1 wherein the housing has a movable portion.

3. The device of claim 1 wherein the information is of a type selected from the group consisting of language, text, music, light, movement and video.

4. The device of claim 1 wherein the source of information is light and light is generated by a light emitting diode.

5. The device of claim 1 wherein the device comprises a video display.

6. The device of claim 5 wherein said housing has the humanoid form or the animate form of a figurine.

7. The device of claim 5 wherein said housing has the humanoid form or the animate form of a jack-in-the-box.

8. The device of claim 1 further comprising an activator switch for the source of information.

*9. A battery charger amusement device comprising:*

*an electrically moved housing having the appearance of a vehicle;*

*a dynamo powering a battery charger in electrical communication with a rechargeable battery.*

*10. A battery charger amusement device comprising:*

*an electrically moved housing having the appearance of an animal;*

*a dynamo powering a battery charger in electrical communication with a rechargeable battery.*

*11. A battery charger amusement device comprising:*

*an electrically moved housing having the appearance of a person;*

*a dynamo powering a battery charger in electrical communication with a rechargeable battery.*

*12. A battery charger amusement device comprising:*

*an electrically moved housing having the appearance of a robot:*

*a dynamo powering a battery charger in electrical communication with a rechargeable battery.*

*13. A battery charger amusement device comprising:*

*an electrically moved housing having the appearance of an animated character;*

*a dynamo powering a battery charger in electrical communication with a rechargeable battery.*

*14. A battery charger amusement device comprising:*

*a battery charger having a rechargeable battery, the battery having a charge status;*

*an electronic circuit monitoring charge status;*

*a dynamo powering said battery charger;*

*a mechanical movement signal activated upon the battery attaining a preselected charge status as measured by said electronic circuit.*

*15. The battery charger amusement device of claim 14 further comprising said electronic circuit communicating information to a user independent of charge status prior to the battery attaining the preselected charge status.*

*16. The device of claim 14 wherein the information is of a type selected from the group consisting of language, text, music, light, movement and video.*

*17. The device of claim 14 further comprising a housing.*

*18. The device of claim 14 wherein said mechanical movement signal is selected from a group consisting of: release of a spring, activation of an electric drive motor to create a mechanical movement, deactivation of said electrical motor, and movement of a liquid or powder.*

*19. The device of claim 17 wherein said housing is configured in a form selected from the group consisting of humanoid, animate, vehicular and natural.*

* * * * *